United States Patent
Dreon et al.

(10) Patent No.: US 10,185,380 B1
(45) Date of Patent: Jan. 22, 2019

(54) ELECTRICAL POWER SUPPLY DEVICE AND METHOD OF OPERATING SAME

(71) Applicant: Delphi Technologies, LLC, Troy, MI (US)

(72) Inventors: Michael J. Dreon, Rochester, MI (US); Mohamad Elghrawi, Sterling Heights, MI (US)

(73) Assignee: Delphi Technologies, LLC, Troy, MI (US)

( * ) Notice: Subject to any disclaimer, the term of this patent is extended or adjusted under 35 U.S.C. 154(b) by 0 days.

(21) Appl. No.: 15/988,161

(22) Filed: May 24, 2018

Related U.S. Application Data

(60) Provisional application No. 62/659,272, filed on Apr. 18, 2018.

(51) Int. Cl.
| | |
|---|---|
| *G06F 1/26* | (2006.01) |
| *G06F 13/40* | (2006.01) |
| *H02J 7/00* | (2006.01) |
| *H02M 3/158* | (2006.01) |

(52) U.S. Cl.
CPC .......... *G06F 1/266* (2013.01); *G06F 13/4081* (2013.01); *H02J 7/0042* (2013.01); *H02M 3/1582* (2013.01); *G06F 2213/0042* (2013.01)

(58) Field of Classification Search
CPC ............ G05F 1/517; H02M 2001/009; H02M 3/33561
USPC ...... 307/31–33, 35; 323/241, 271, 274, 275, 323/283–285; 363/78, 79
See application file for complete search history.

(56) References Cited

U.S. PATENT DOCUMENTS

| | | | | |
|---|---|---|---|---|
| 2011/0068626 | A1* | 3/2011 | Terlizzi ..................... | H02J 1/08 307/32 |
| 2015/0188325 | A1* | 7/2015 | Wagner ................. | H02J 7/0085 307/31 |
| 2015/0198932 | A1* | 7/2015 | Cha ........................ | H02M 3/156 700/295 |
| 2016/0072317 | A1* | 3/2016 | Guz ...................... | H02J 7/0021 320/162 |

* cited by examiner

*Primary Examiner* — Gary Nash
(74) *Attorney, Agent, or Firm* — Robert J. Myers

(57) ABSTRACT

An electrical power supply device includes a DC-DC power convertor receiving an input voltage and producing an output voltage, a first and second port connected to the DC-DC power convertor supplying electrical power to a first and second consumer device, and a device controller connected to the DC-DC power convertor, the first and second port. The memory device controller stores instructions to command the DC-DC power convertor to produce the output voltage between a first voltage threshold and a higher second voltage threshold when only the first consumer device is connected to the first port. The memory stores additional instructions which commands the DC-DC power convertor to produce the output voltage at the first voltage threshold when the first consumer device is connected to the first port and the second consumer device is connected to the second port.

11 Claims, 2 Drawing Sheets

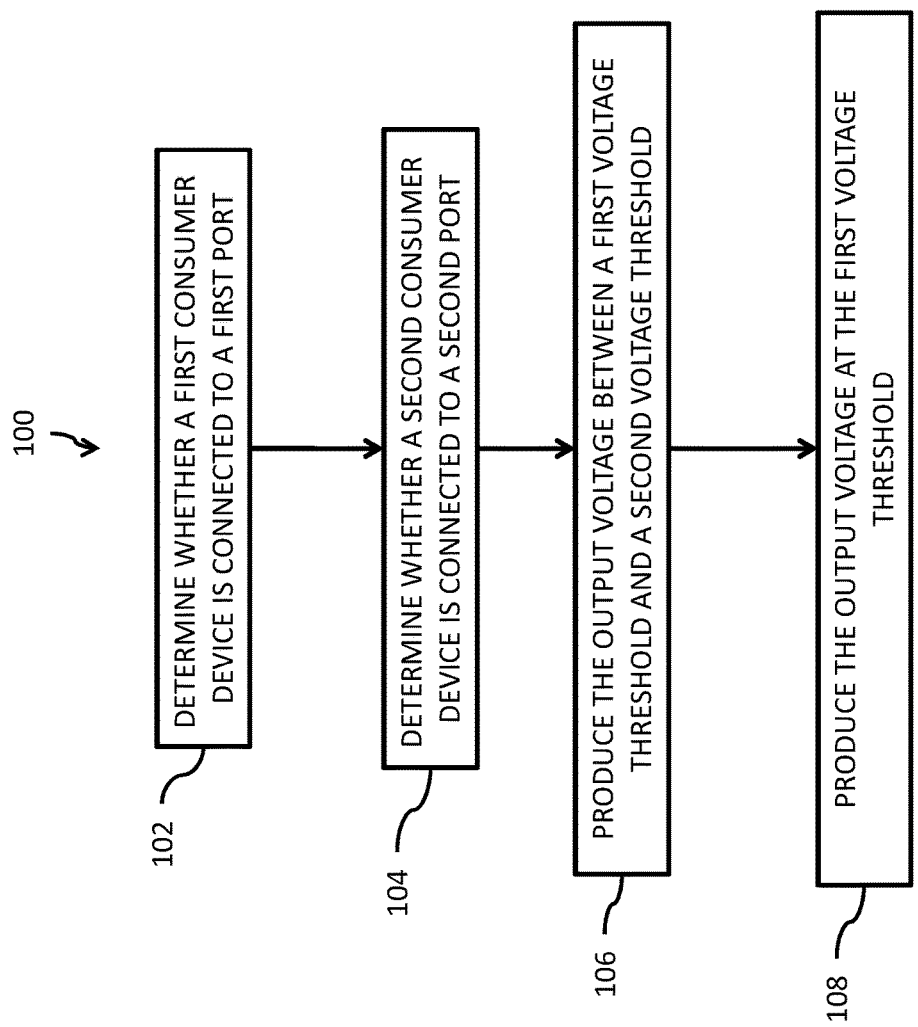

ELECTRICAL POWER SUPPLY DEVICE AND METHOD OF OPERATING SAME

CROSS-REFERENCE TO RELATED APPLICATION

This application claims the benefit under 35 USC § 119(e) of U.S. Provisional Patent Application No. 62/659,272 filed on Apr. 18, 2018, the entire disclosure of which is hereby incorporated by reference.

TECHNICAL FIELD OF THE INVENTION

The invention generally relates to an electrical power supply device and method of operating the electrical power supply device.

BRIEF DESCRIPTION OF THE SEVERAL VIEWS OF THE DRAWING

The present invention will now be described, by way of example with reference to the accompanying drawings, in which:

FIG. 2 is a flow chart of a method of operating the electrical power supply device, according to one embodiment.

DETAILED DESCRIPTION OF THE INVENTION

Figure 1:
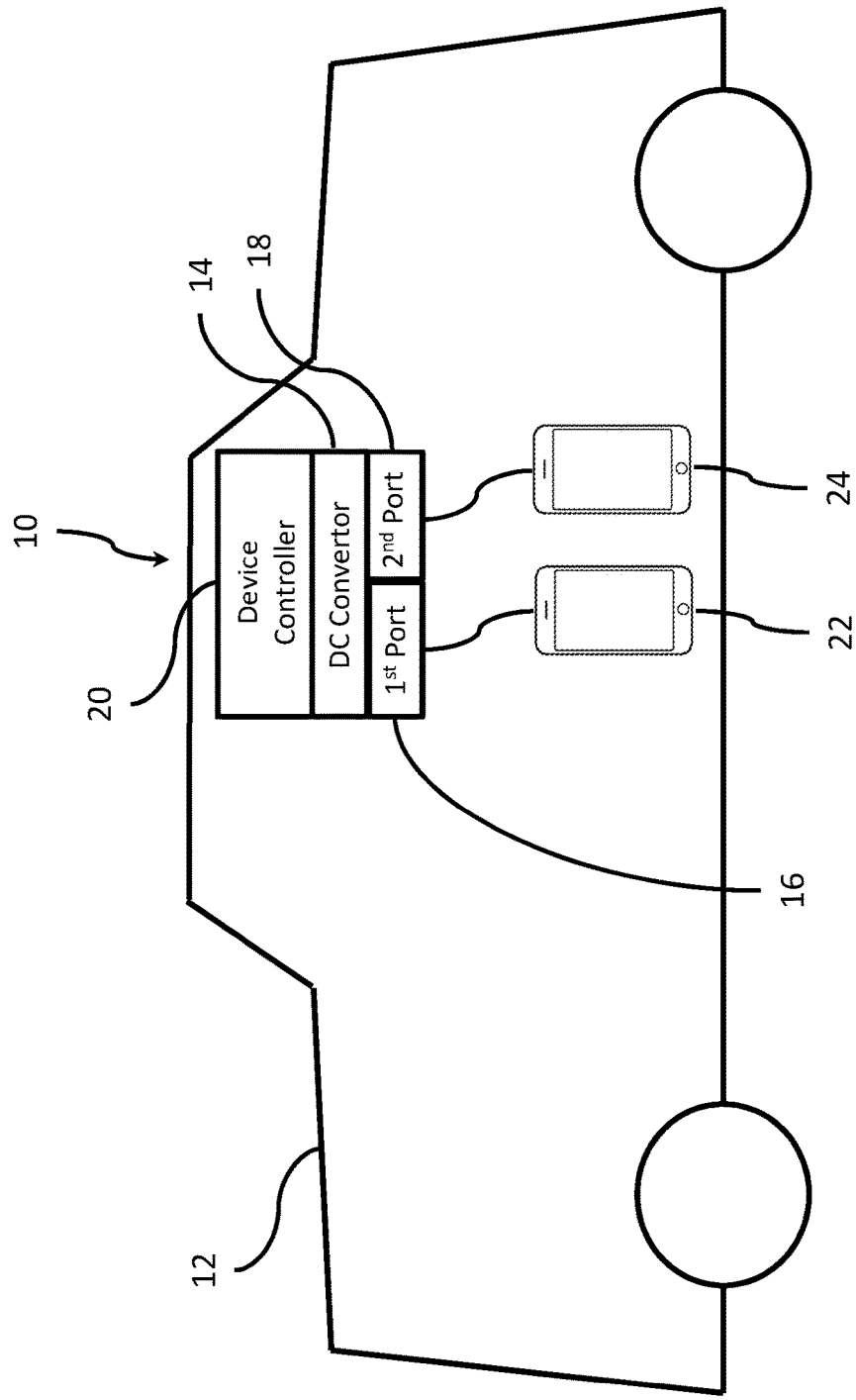
FIG. 1 is a schematic diagram of an electrical power supply device, according to one embodiment.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The Universal Serial Bus (USB) has evolved from a data interface capable of supplying limited power to a primary provider of power with a data interface. Today many devices charge or get their power from USB ports contained in laptops, cars, aircraft or even wall sockets. USB has become a ubiquitous power socket for many consumer devices such as cellular telephones, digital media players and/or other hand-held devices. Users utilize USB to fulfil their requirements not only in terms of data but also to provide power to, or charge, their devices simply, often without the need to load a driver, in order to carry out "traditional" USB functions.

The USB Power Delivery (PD) Specification enables the maximum functionality of USB by providing more flexible power delivery, e.g. for battery charging, along with data over a single cable. Its aim is to operate with and build on the existing USB ecosystem. The USB Power Delivery Specification 2.0 and the USB Power Delivery Specification 3.0 are published by the USB Implementer's Forum, Inc and each is incorporated by reference herein.

A proposed innovative solution is to provide a single electrical power supply device that is connected to multiple ports which are each configured to connect with a consumer device. The electrical power supply device includes a DC-DC power convertor that receives an input voltage, e.g. from the vehicle battery and produces a different output voltage. The DC-DC power convertor is connected to each of the ports. The electrical power supply device also includes a device controller in communication with the DC-DC power convertor, the first port, and the second port. The device controller is programmed to command the DC-DC power convertor to produce the output voltage between a first voltage threshold, e.g. 5 volts and a second voltage threshold, e.g. 20 volts when a consumer device is connected only to a single port and there are no other consumer devices connected to any of the other ports. The device controller is further programmed to command the DC-DC power convertor to produce the output voltage at the first voltage threshold when multiple consumer devices are connected to multiple ports.

This innovation provides offer a lower cost "entry level" PD solution for multiple ports since it eliminates the need for a dedicated power supply for each port while still offering PD charging capability on one port at a time.

FIG. 1 illustrates an electrical power supply device, e.g. a Universal Serial Bus (USB) power delivery (PD) device, hereinafter referred to as the PD device 10 that is designed for use in a motor vehicle 12. The PD device 10 may be used to support battery charging of USB enabled devices in the vehicle 12 (not shown). The PD device 10 includes a buck-only DC-DC power convertor, hereinafter referred to as the DC convertor 14, that receives an input voltage from a vehicle's electrical system. The output voltage can by one of at least two different voltages, e.g. a 5 volt output to support a normal USB charge rate or a 9 volt output to support an enhanced USB charge rate. The DC convertor 14, being a buck-only DC-DC power convertor, is incapable of providing an output voltage that is greater than the input voltage.

Alternatively, the DC convertor 14 may be a "buck/boost" type that generates an output voltage from 5 volts to 21 volts which is both above and below the typical vehicle input voltage of 12 to 14 volts.

The DC convertor 14 is connected to at least two USB ports, e.g. USB-C type ports (see USB Type-C Specification 1.0 published by the USB Implementer's Forum), that are configured to connect with and supply electrical power for charging to consumer devices and are hereinafter referred to as first port 16 and second port 18.

The PD device 10 also includes a device controller 20 in communication with the DC convertor 14 and the first and second ports 16, 18. The device controller 20 has one or more processors and memory. The processors may be a microprocessors, application specific integrated circuits (ASIC), or built from discrete logic and timing circuits (not shown). Software instructions that program the processors may be stored in a non-volatile (NV) memory device (not shown). The NV memory device may be contained within the microprocessor or ASIC or it may be a separate device. Non-limiting examples of the types of NV memory that may be used include electrically erasable programmable read only memory (EEPROM), masked read only memory (ROM), and flash memory.

The memory stores instructions that cause the device controller 20 to communicate with the first and second ports 16, 18 to determine whether a consumer devices is connected to the first and/or second ports 16, 18. If the device controller 20 determines that a consumer device 22 is concerted to only to the first port 16 and no consumer devices are connected to the second port 18 or any other port (not shown), the device controller 20 will communicate with the connected first consumer device 22 thought the first port 16 according to the USB PD protocol to negotiate an output voltage between a first voltage threshold, e.g. 5 volts and a second voltage threshold, e.g. 21 volts and command the DC convertor 14 to provide the output voltage at the negotiated voltage. If the device controller 20 determines that the consumer device 22 is connected to the first port 16 and another consumer device 24 is connected to the second port 18, the device controller 20 will communicate with the connected first and second consumer devices 22, 24 thought the first and second ports 16, 18 according to the USB PD protocol to inform the consumer devices that the output voltage is fixed at the lower first voltage threshold.

If the first port 16 is connected to the first consumer device 22 and the DC convertor 14 is supplying the output voltage at the second threshold when the second consumer device 24 is connected to the second port 18, the device controller 20 will confirm that the DC convertor 14 is producing the output voltage at the first voltage threshold before supplying the output voltage to the second port 18.

The PD device 10 may also include interface circuitry (not shown), such as a controller area network (CAN) transceiver, a local interconnect network (LIN) transceiver, a USB transceiver, and/or an analog/digital convertor circuit to allow the PD device 10 to establish electrical communication with other devices within the vehicle 12.

In an embodiment that includes a buck/boost DC convertor 14 and conforms to Universal Serial Bus (USB) Power Delivery Specification 2.0, the first voltage threshold is 5 volts and the second voltage threshold is 20 volts.

In another embodiment that includes a buck/boost DC convertor 14 and conforms to Universal Serial Bus (USB) Power Delivery Specification 3.0, the first voltage threshold is 5 volts and the second voltage threshold is 21 volts.

The buck/boost DC convertor 14 has a current output capacity that is limited to 6 amperes when the output voltage is less than or equal to the input voltage. The current output capacity of the DC convertor 14 is limited to 5 amperes when the output voltage is greater than the input voltage. The PD device 10 may include power switches that are used to limit the current on the first and second ports 16, 18.

In yet another embodiment that includes a buck-only DC convertor 14 and conforms to Universal Serial Bus (USB) Power Delivery Specification 2.0, the first voltage threshold is 5 volts and the second voltage threshold is 9 volts. The buck-only DC convertor 14 has a current output capacity that is limited to 6 amperes. Again, the PD device 10 may include power switches that are used to limit the current on the first and second ports 16, 18.

FIG. 2 illustrates a method 100 of operating the PD device 10 which includes the device controller 20, the DC convertor 14, the first port 16, and the second port 18. The device controller 20 has one or more processors and memory. The method 100 includes the following steps:

STEP 102, DETERMINE WHETHER A FIRST CONSUMER DEVICE IS CONNECTED TO A FIRST PORT, includes the PD device 10 determining whether the first consumer device 22 is connected to the first port 16;

STEP 104, DETERMINE WHETHER A SECOND CONSUMER DEVICE IS CONNECTED TO A SECOND PORT, includes the PD device 10 determining whether the second consumer device 24 is connected to the second port 18;

STEP 106, PRODUCE THE OUTPUT VOLTAGE BETWEEN A FIRST VOLTAGE THRESHOLD AND A SECOND VOLTAGE THRESHOLD, includes the PD device 10 producing an output voltage that is between a first voltage threshold and a second voltage threshold in accordance with the device controller 20 determining that the first consumer device 22 is connected to the first port 16 and the second consumer device 24 is not connected to the second port 18. This second voltage threshold is higher than the first voltage threshold; and STEP 108, PRODUCE THE OUTPUT VOLTAGE AT THE FIRST VOLTAGE THRESHOLD, includes the PD device 10 producing the output voltage at the first voltage threshold via the DC-DC power convertor in accordance with the device controller 20 determining that the first consumer device 22 is connected to the first port 16 and the second consumer device 24 is connected to the second port 18.

Accordingly, an electrical power supply device, e.g. a USB PD device 10, and a method 100 of operating such a PD device 10 is provided. The PD device 10 and method 100 provides the benefit of a USB PD device 10 that is capable of supporting multiple ports with a single DC convertor at a lower cost than prior USB PD device designs.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. An electrical power supply device, comprising:
   a DC-DC power convertor receiving an input voltage and producing an output voltage;
   a first port in electrical communication with the DC-DC power convertor configured to supply electrical power to a first consumer device;
   a second port distinct from the first port and in electrical communication with the DC-DC power convertor configured to supply electrical power to a second consumer device;
   a device controller in communication with the DC-DC power convertor, the first port, and the second port, said device controller having one or more processors and memory, wherein the memory includes instructions which causes the device controller to command the DC-DC power convertor to produce the output voltage between a first voltage threshold and a second voltage threshold higher than the first voltage threshold in accordance with the first consumer device being connected to the first port and the second consumer device not being connected to the second port, wherein the memory further includes instructions which causes the device controller to command the DC-DC power convertor to produce the output voltage at the first voltage threshold in accordance with the first consumer device being connected to the first port and the second consumer device being connected to the second port.

2. The electrical power supply device according to claim 1, wherein the DC-DC power convertor has a buck-boost configuration and wherein the first voltage threshold is 5 volts.

3. The electrical power supply device according to claim 1, wherein the second voltage threshold is 20 volts.

4. The electrical power supply device according to claim 1, wherein the electrical power supply device conforms to Universal Serial Bus (USB) Power Delivery Specification 2.0.

5. The electrical power supply device according to claim 1, wherein the second voltage threshold is 21 volts.

6. The electrical power supply device according to claim 1, wherein the electrical power supply device conforms to USB Power Delivery Specification 3.0.

7. The electrical power supply device according to claim 1, wherein the DC-DC power convertor has a first maximum current output capacity of 6 amperes in accordance with the output voltage being equal to or less than the input voltage and wherein the DC-DC power convertor has a second maximum current output capacity of 5 amperes in accordance with the output voltage being greater than the input voltage.

8. The electrical power supply device according to claim 1, wherein the DC-DC power convertor has a buck-only configuration and wherein the first voltage threshold is 5 volts and the second voltage threshold is 9 volts.

9. The electrical power supply device according to claim 8, wherein the electrical power supply device conforms to USB Power Delivery Specification 2.0.

10. The electrical power supply device according to claim 8, wherein the DC-DC power convertor has a maximum current output capacity of 6 amperes.

11. A method, comprising:
    at a device controller, a DC-DC power convertor producing an output voltage in communication with the device controller, a first port in electrical communication with the DC-DC power convertor configured to supply electrical power to a first consumer device, and a second port distinct from the first port and in electrical communication with the DC-DC power convertor configured to supply electrical power to a second consumer device, said device controller having one or more processors and memory:
    determining whether the first consumer device is connected to the first port;
    determining whether the second consumer device is connected to the second port;
    producing the output voltage between a first voltage threshold and a second voltage threshold higher than the first voltage threshold via the DC-DC power convertor in accordance with the device controller determining that the first consumer device is connected to the first port and the second consumer device is not connected to the second port; and
    producing the output voltage at the first voltage threshold via the DC-DC power convertor in accordance with the device controller determining that the first consumer device is connected to the first port and the second consumer device is connected to the second port.

* * * * *